United States Patent [19]
Harker

[11] Patent Number: 5,917,648
[45] Date of Patent: Jun. 29, 1999

[54] PACKAGED OPTICAL AMPLIFIER ASSEMBLY

[75] Inventor: Andrew Thomas Harker, Ipswich, United Kingdom

[73] Assignee: Hewlett-Packard Company, Palo Alto, Calif.

[21] Appl. No.: 08/750,671

[22] PCT Filed: Jun. 16, 1995

[86] PCT No.: PCT/GB95/01407

§ 371 Date: Mar. 20, 1997

§ 102(e) Date: Mar. 20, 1997

[87] PCT Pub. No.: WO95/35590

PCT Pub. Date: Dec. 28, 1995

[30] Foreign Application Priority Data

Jun. 22, 1994 [GB] United Kingdom ............... 9412528

[51] Int. Cl.[6] .................. G02B 6/40; H01S 3/06; G02F 1/09
[52] U.S. Cl. ............... 359/341; 359/134; 359/163; 385/1; 385/134
[58] Field of Search ................ 359/134, 160, 359/163, 174, 341; 385/1, 97, 134

[56] References Cited

U.S. PATENT DOCUMENTS

| | | |
|---|---|---|
| 4,804,256 | 2/1989 | Wilson . |
| 5,105,307 | 4/1992 | Nishiyama et al. . |
| 5,121,451 | 6/1992 | Grard et al. .................... 385/33 |

FOREIGN PATENT DOCUMENTS

| | | |
|---|---|---|
| 0 372 448 | 12/1989 | European Pat. Off. . |
| 0 409 258 | 7/1990 | European Pat. Off. . |
| 0 444 694 | 3/1991 | European Pat. Off. . |
| 0 508 149 | 3/1992 | European Pat. Off. . |
| 0 520 199 | 5/1992 | European Pat. Off. . |
| 0 563 524 | 1/1993 | European Pat. Off. . |
| 0 586 713 | 3/1993 | European Pat. Off. . |
| 2 678 075 | 6/1992 | France . |
| H1-194200 | 3/1991 | Japan . |
| 2 138 585 | 10/1981 | United Kingdom . |

OTHER PUBLICATIONS

Delavaux et al, IEEE Photonics Technology Letters, 6, 1994–Mar, #3, pp. 376–379.

Nakagawa et al, Jour. of Lightwave Tech., vol. 9, #2, Feb. 1991, pp. 198–208.

Article entitled In–Line (Pigtailed) Polarization–Independent Optical Isolator by W.L. Emkey et al., Optical Fiber Communication Conference, 1989 Technical Digest Series, vol. 5, Conference Edition, Feb. 6–9, 1989, p.14g.

Primary Examiner—Nelson Moskowitz

[57] ABSTRACT

A packaged optical amplifier assembly includes an erbium doped silica based optical amplifying fiber (330) co-pumped and counter-pumped by a pair of laser diodes (336) as optical pumps. The optical pumps (336) are each coupled to an end (332, 340) of the fiber (330) by reflection from a dichroic mirror (328), the optical signal being collimated and arranged to propagate unguided between the input (306) and the first end (332), and the second end (340) and the output (346), and optical pump light from each optical pump (336) being collimated and arranged to propagate unguided between the optical pump (336) and the end of the fiber (332, 340) to which it is coupled.

12 Claims, 5 Drawing Sheets

PACKAGED OPTICAL AMPLIFIER ASSEMBLY

This invention relates to packaged optical amplifier assemblies to which an optical signal can be applied at an input and an amplified optical signal is provided at an output. The invention relates particularly to optical amplifier assemblies in which amplification is provided by means of an optical amplifying fibre pumped by an optical pump.

The process of optical amplification by optical amplifying fibres is well known and will not be described in detail in this application. In broad terms, the core region of the optical fibre contains a dopant, for example erbium ions, which once optically excited can provide optical gain to an optical signal of suitable wavelength propagating along the fibre. The dopant is excited by passing an optical pump signal of a suitable wavelength along the fibre. For example, an erbium doped fibre can provide amplification to optical signals of wavelengths in the range 1520 nm to 1580 nm when pumped by an optical pump signal of wavelength of about 1480 nm or 980 nm. Suitable fibres and optical pumps for providing amplification at various wavelengths are readily available commercially.

A currently available packaged optical amplifier assembly is shown schematically at FIGS. 1 and 2. It includes a number of commercially available optical components whose pigtails are spliced together to form the required optical circuit for the amplifier. FIG. 1 shows, schematically, an assembled packaged optical amplifier 102. FIG. 2 shows the components of the package of FIG. 1 laid out as a key to show more clearly how the components are interconnected.

The optical amplifier assembly 102 is packaged in a housing comprising two interlocking metal compartments 104 and 106, the former holding passive optical components, the latter holding a printed circuit board (PCB) 108 on which are mounted optical components with electrical connections. The associated electronic components on the PCB are not shown. Fibre splices will be indicated by reference to the splice protectors which surround them.

Optical signals to be amplified by the optical amplifier assembly 102 are coupled to an input pigtail 110 by connecting to it a source optical fibre (not shown). The input pigtail 110 is coupled to the input pigtail of an input isolator 112 by splice 114, the output pigtail of which is coupled to a first pigtail of an input dichroic wavelength division multiplexer (WDM) 116 by splice 118. The output pigtail of a first laser diode optical pump 120 is coupled to a second pigtail of the dichroic WDM 116 by a splice 122. The WDM 116 outputs a combined input optical signal and optical pump signal at a third pigtail which is spliced to a first end 124 of a 30 m long erbium-doped, silica based fibre 126 by a splice 128.

The amplifying fibre 126 is wound on a pair of bobbins 130 and 132.

A second end 134 of the amplifying fibre 126 is coupled to a first pigtail of an output dichroic WDM 136 by a splice 138. The output pigtail of a second laser diode optical pump 138 is coupled to a second pigtail of the output WDM 136 by a splice 139. The output WDM 136 outputs the optical pump signal to the second end 134 of the amplifying fibre 126 whilst outputting an amplified optical signal received from the second end 134 of the amplifying fibre 126 to an output optical isolator 140, the pigtails of the output WDM 136 and output isolator 140 being coupled by a splice 142.

The output pigtail of the output isolator 140 is coupled to the input pigtail of an optical fibre coupler 144 by a splice 146. One output pigtail of the coupler 144 is coupled to the input pigtail of a monitor diode 148 by a splice 150, a second output pigtail of the coupler 144 being coupled to an output pigtail 152 of the packaged amplifier 102 by a splice 154.

The optical pump 120 co-pumps the amplifying fibre 126 whilst the optical pump 138 counter-pumps the amplifying fibre 126.

There are several disadvantages associated with such prior art assemblies. The packages are bulky because of the constraints set by the minimum radius of curvature of the pigtails of the optical components.

The requirement to couple the input isolator to the input WDM produces a circle of fibre about 66 mm in diameter which together with the length of the optical devices and the splice protectors places a constraint on the package dimensions in the plane of the circle of the fibres. The need to couple the devices via their prepackaged pigtail input and output fibres means the optical signals undergo many transitions between guided and non-guided (free) propagation at collimating lenses within the packaged optical components.

Each optical isolator has two, and each WDM at least two and sometimes three, collimators, arranged at each of their inputs and outputs. There is also a need to splice the various pigtails together which is a labour intensive operation.

The present invention seeks to provide a more compact packaged optical amplifier assembly. Accordingly there is provided a packaged optical amplifier assembly for amplifying an optical signal the assembly having an input, an output, an optical amplifying fibre having ends coupled to the input and output, respectively, and an optical pump coupled to one of the ends of the fibre, the optical signal being collimated and arranged to propagate unguided between said one of the ends and whichever of the input and the output is coupled to said one of the ends, and optical pump light from the optical pump being collimated and arranged to propagate unguided between the optical pump and the end of the fibre to which it is coupled and in which the optical pump light and optical signal are combined by a dichroic mirror.

There may be pumps coupled to both the first and second ends of the fibre.

The provision of such optical coupling of the input, output, and pump sources to the appropriate first and second ends of the fibre eliminates the requirement for fibre guiding between the components thus reducing the number of collimating lenses compared to an equivalent prior art assembly and consequently the number of guided to unguided transitions. Also, the only curved fibre component is the amplifying optical fibre which can be bent to a circle of diameter in the order of 30 mm, compared to about 60 mm for a common transmission fibre, thus allowing the dimensions of the package to be greatly reduced.

If a single optical pump is used it can be coupled to the first or to the second end of the optical amplifying fibre. It is not unusual however, to input pump power at both ends of the amplifying fibre.

Each optical pump is preferably located to minimise the angle of reflection of the pump signal by the dichroic mirror and the angle the mirror presents to the optical signal propagating through the mirror to minimise polarisation effects on reflection and transmission, for example by locating them adjacent to the end of the fibre to which it is optically coupled.

It is convenient to arrange the optical axes of the input and first end of the fibre, and of the output and the second end of the fibre, to be coincident but it is also possible to set them at an angle with a highly reflecting mirror between them. This would allow the input and output to be at right angles to the optical axes of the ends of the fibre if preferred.

The optical pump light may be reflected from an auxiliary mirror before being combined with the optical signal by the dichroic mirror. The use of such an auxiliary mirror makes it easier to align the pump light with the optical signal.

The 980 nm semiconductor pump lasers are particularly susceptible to degradation if organic compounds contaminate their surfaces. It is preferable then, that each pump laser is contained within an hermetically sealed sub-package within the optical amplifier assembly package. The dichroic mirror coupling the optical pump to the amplifying fibre may form an optical window in this hermetically sealed sub-package. Preferably however each pump laser is contained within a separate hermetically sealed sub-package within the optical amplifier assembly package with the lenses which collimate the optical pump light forming optical windows in the sub-packages.

It is usual to incorporate optical isolators at the input and output of the optical amplifier assembly as described above with reference to FIGS. 1 and 2. It has been found to be beneficial to mount such isolators with the optical pumps on a common thermoelectric cooling means to reduce the temperature dependency of the isolators' performance.

A novel optical isolator which may be used in other applications but which is particularly suitable for use with the optical amplifier assembly of the present invention comprises a housing having a through-hole, and a 45° Faraday rotator comprising a disc of magneto-optically active material located within the through-hole by a pair of annular permanent magnets, one on either side of the disc.

Such an isolator is particularly compact and easy to assemble and by operating on non-guided optical signals can be simply interposed in the apparatus of the present invention between the input and the first end of the fibre, and the second end of the fibre and the output, without the need for additional collimating lenses. It is to be noted that such an isolator could be employed in optical apparatus other than the optical amplifier apparatus of the present invention. Its use is optional, but preferred, with the amplifier assembly of the present invention.

An embodiment of the invention will now be described, by way of example only, with reference to the accompanying drawings of which:

Figure 1:
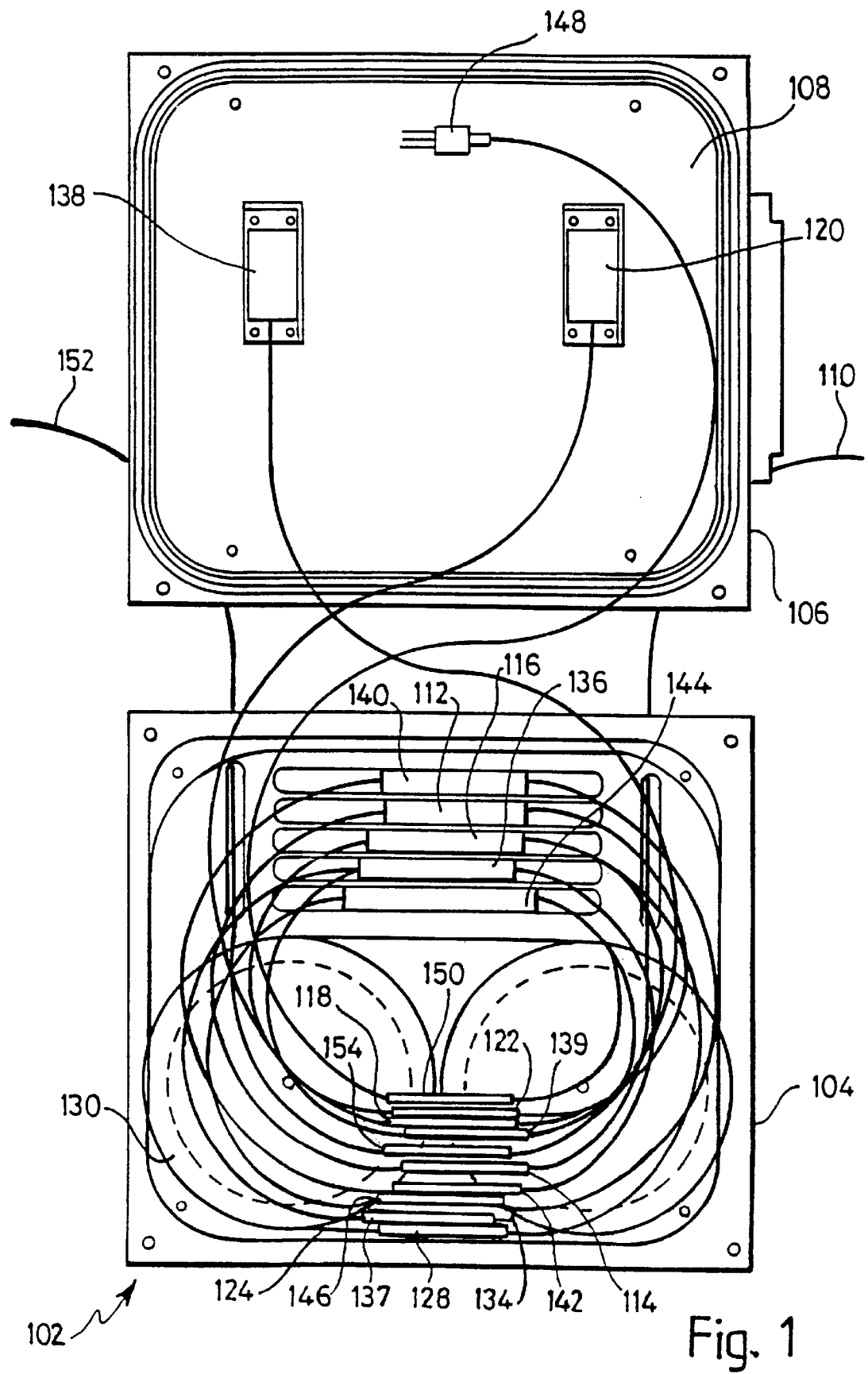
FIG. 1 is a schematic diagram of a prior art packaged optical fibre amplifier assembly.
Figure 2:
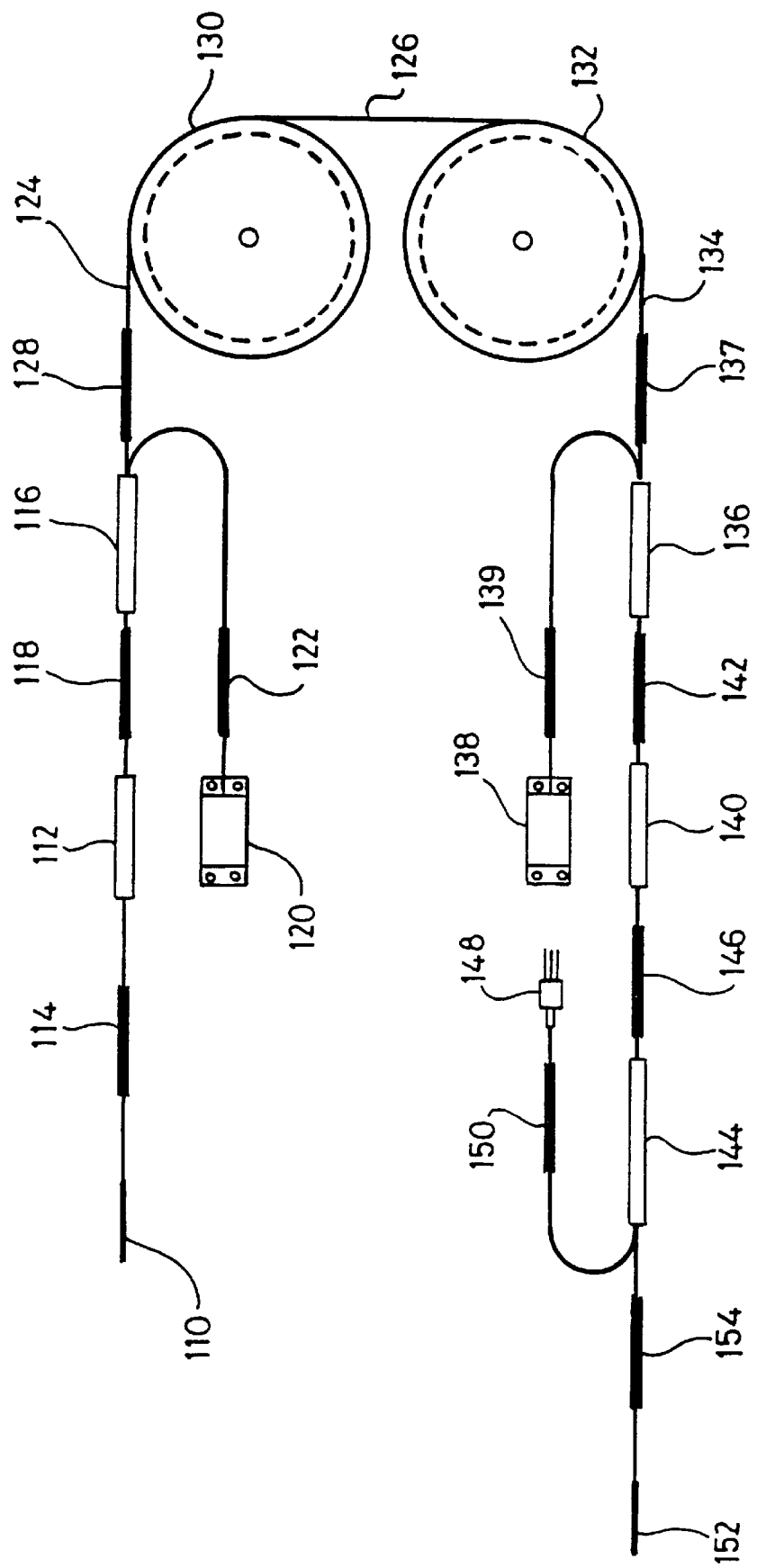
FIG. 2 is a schematic diagram showing the interconnections of the optical components of the assembly of FIG. 1.
Figure 3:
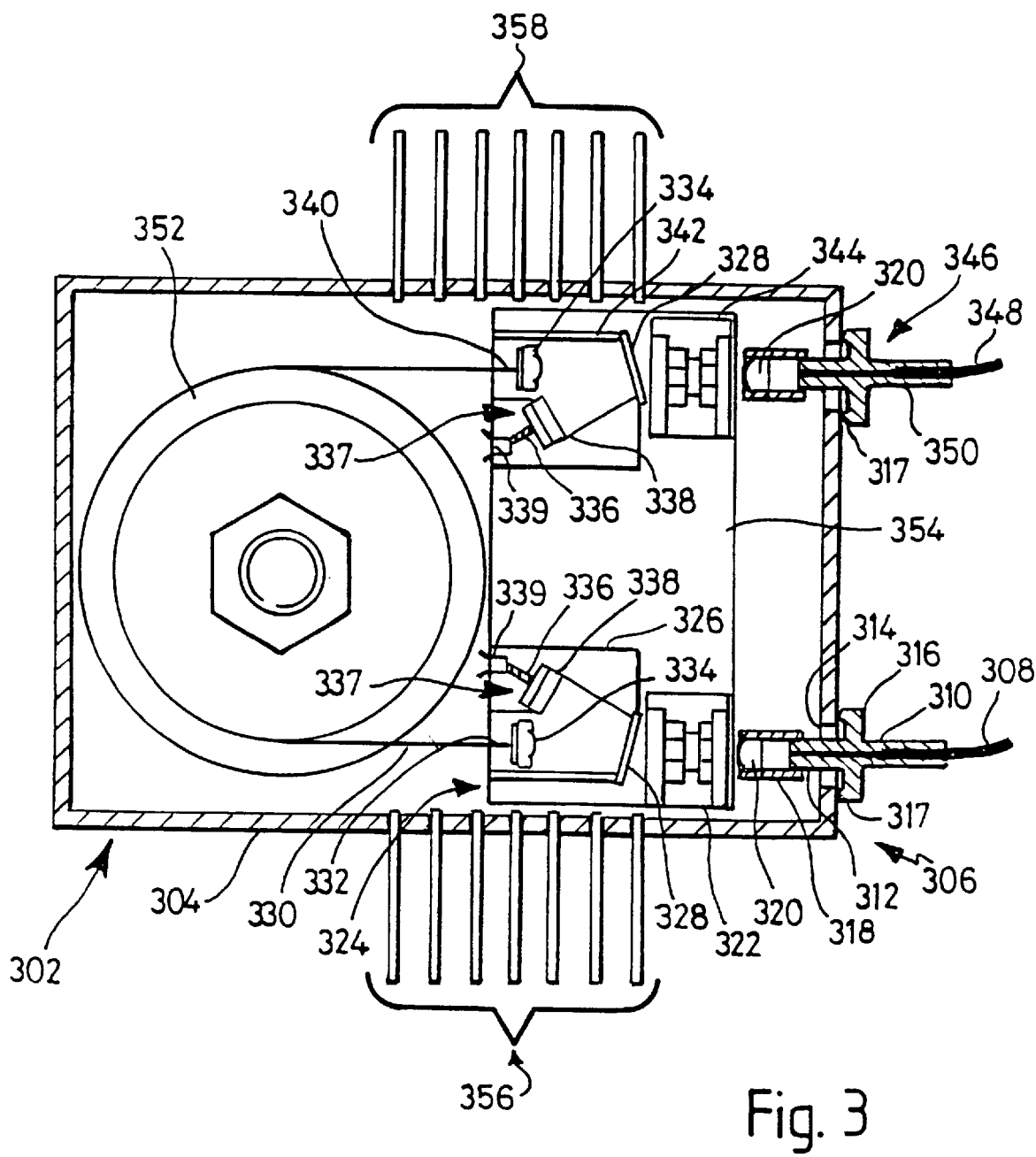
FIG. 3 is a schematic sectional plan view of a packaged optical fibre amplifier assembly in accordance with the present invention.

Referring to FIG. 3 which shows an embodiment of the present invention, a packaged optical amplifier assembly 302 is housed in a metal housing 304. The lid of the housing is not shown.

An optical signal to be amplified is coupled to an input 306 via a pigtail optical fibre 308 which is hermetically sealed with glass solder (not shown) within a metal feedthrough 310 which has a tubular portion 312 passing through a circular aperture 314 in the housing 304. The feedthrough 310 has an annular flange 316 of radius greater than the aperture 314 an outer raised rim 317 which is projection welded to the housing 304 once the feedthrough 310 has been aligned within the aperture 314.

A tubular collar 318, initially a sliding fit on the outside of the tubular portion 312 of the feedthrough 310, supports within it a collimating lens 320 at the end of the collar 318 distant from the feedthrough 310. The collar 318 is adjusted longitudinally on the feedthrough 310 until positioned to accurately collimate light exiting the fibre 308 whereupon it is fixed in position on the feedthrough 310. Collimated light from the collimating lens 320 propagates through an optical isolator 322 (which will be described in detail later) to an optical multiplexer 324.

The optical multiplexer 324 comprises a sub-carrier 326 with a dichroic mirror 328 (a multilayer, high pass filter) which transmits light of a frequency to be amplified by an erbium-doped amplifying optical fibre 330 a first end 332 of which extends into, and is attached to, the sub-carrier 326. Erbium-doped fibre is obtainable from Lycom A/S, NKT Alle 75, DK-2605, Brøndby, Denmark and Fibrecore Ltd., York House, School Lane, Chandlers Ford, Hampshire S05 3DG, England, for example. A lens 334 couples light propagating from the collimating lens 320 into the amplifying fibre 330.

Also included in the housing 325 is a 1480 nm diode laser 336, which may be mounted in an hermetically sealed sub-package. Suitable lasers are manufactured by Hewlett-Packard Ltd., Whitehouse Road, Ipswich, Suffolk IP1 5PB, England and Lasertron, 37 North Avenue, Burlington, Mass. 01803, USA, for example. The laser 325 is the optical pump for the amplifying fibre 330 in this exemplary embodiment of the present invention. The optical pump power from the laser 336 is collimated by a lens 338 (which may be sealed in the same sub-package as the laser 336) and reflected by the dichroic mirror to the lens 334 associated with the first end 332 of the amplifying fibre 330 and so is coupled into the fibre 330. A pump monitor diode 339 is used to monitor the optical output of the laser diode 336 in known manner.

An optical signal propagates along the fibre 330 to a second end 340 which mounted on a sub-carrier 342 which is the mirror image (along the axis of the fibre end 340) to sub-carrier 326 and whose components have been accorded the same reference numerals as the corresponding components of sub-carrier 326. The optical pump power from the laser 336 of the sub-carrier 342 is coupled to the second end 340 of the fibre 330 via the dichroic mirror 328. In this case, the optical signal exits the second end 340 of the fibre 330, is collimated by lens 334 and is transmitted through the dichroic mirror 328 via an optical isolator 344 to an output 346 of the amplifying assembly 302. The optical isolator 344 and output 346 are the same as the optical isolator 322 and input 306. The lens 320 of the output 346 couples the optical signal from the second end 340 of the fibre 330 to an output fibre 348 sealed within a feedthrough 350 which is exactly the same as feedthrough 306 and aligned and fixed to the housing 304 in the same manner.

In the present embodiment there are two pump lasers 336, one co-pumping and the other counter-pumping the fibre 330 but only one of these need be used.

The amplifying fibre 330 is a 20 m long silica based erbium doped optical fibre, wound on a 15 mm radius bobbin 352.

The sub-carriers 326 and 342 and optical isolators 322 and 344 are all mounted on a common thermoelectric cooler 354 to provide relatively temperature insensitive operation to the performance of the amplifying assembly 302.

The various electrical inputs and outputs to and from the laser diodes 336, monitor diodes 339 and thermoelectric cooler 354 are provided at sets of electrical leads 356 and 358. The leads 356 and 358 are sealed to the housing 304 by glass solder seals in known manner. The housing 302 is of a metal whose thermal expansion matches that of the glass solder, for example Kovar (trademark).

Figure 4:
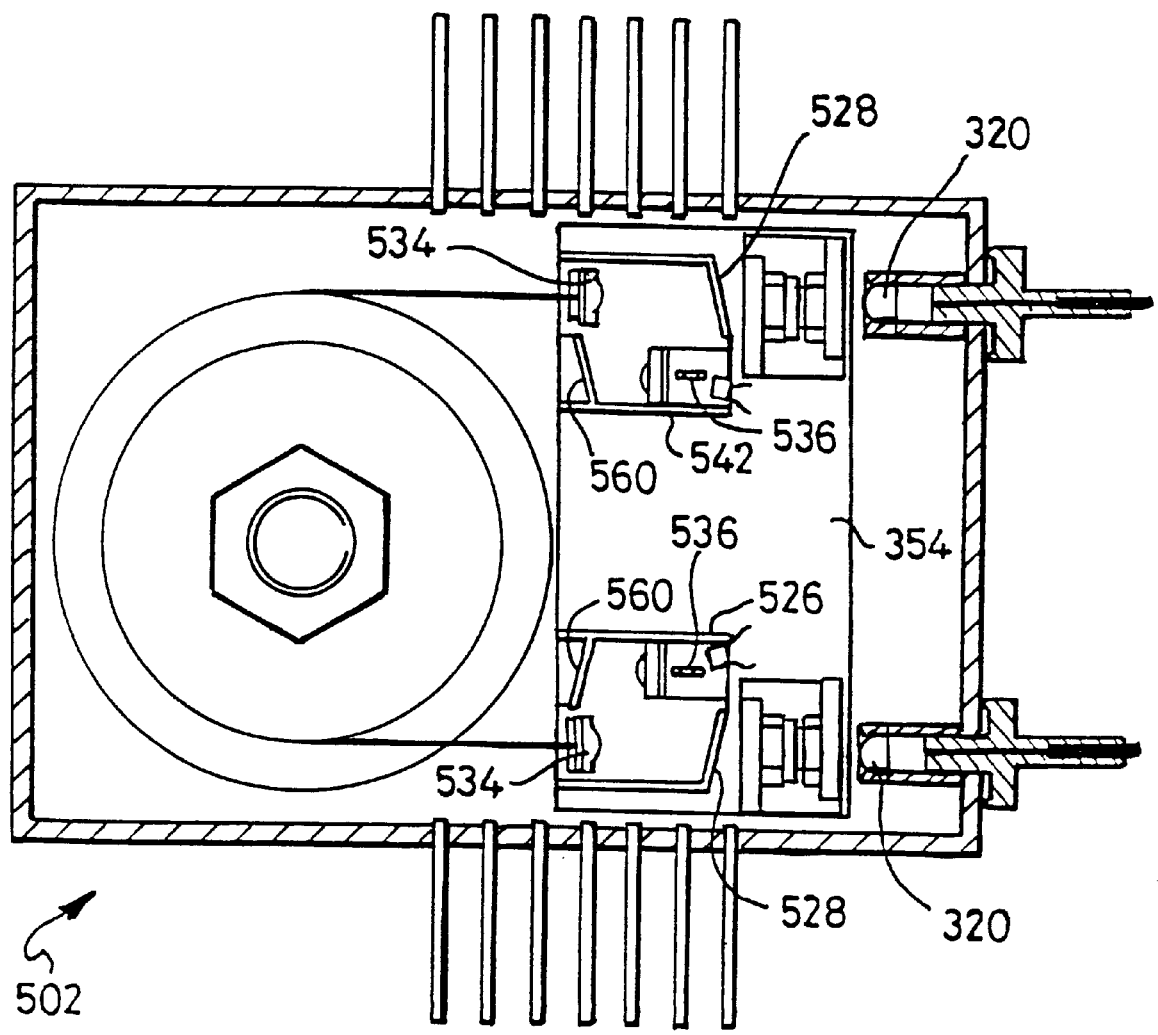
FIG. 4 is a schematic sectional plan view of a packaged optical fibre amplifier assembly in accordance with an alternative embodiment of the present invention.

FIG. 4 shows an assembly 502 which corresponds substantially to the assembly 302 of FIG. 3. Components which are common to both the assemblies of FIGS. 3 and 4 will not be describe again. However the assembly 502 has sub-carriers 526 and 542 which differ from the corresponding sub-assemblies in FIG. 3, and these sub-carriers will be described below.

Each sub-assembly has a dichroic mirror 528 mounted in the light path between a collimating lens 320 and a lens 534 at each end of the fibre. A laser 536 is mounted in the sub-assembly and has its output directed to a mirror 560. The mirrors 528 and 560 are angled to reflect the light from the laser 536 so that it is aligned with the light passing between the collimating lens 320 and the lens 534. Both these mirrors are adjustable to enable this alignment to be achieved.

The alignment required is that of parallelness and colinearity. This requires adjustment of four degrees of freedom; movement in two orthogonal planes to produce parallelness and movement about two orthogonal axes to produce colinearity. This adjustment can be achieved with the arrangement of FIG. 3, but it may require adjustment of the position of the laser 336 itself. In order to ensure good thermal conduction between the laser and the cooler 354, the laser should be permanently fixed to the cooler. The use of the auxiliary mirror 560 of FIG. 4 allows the laser to be permanently fixed in position and the alignment to be achieved by moving the mirrors 528 and 560.

Figure 5:
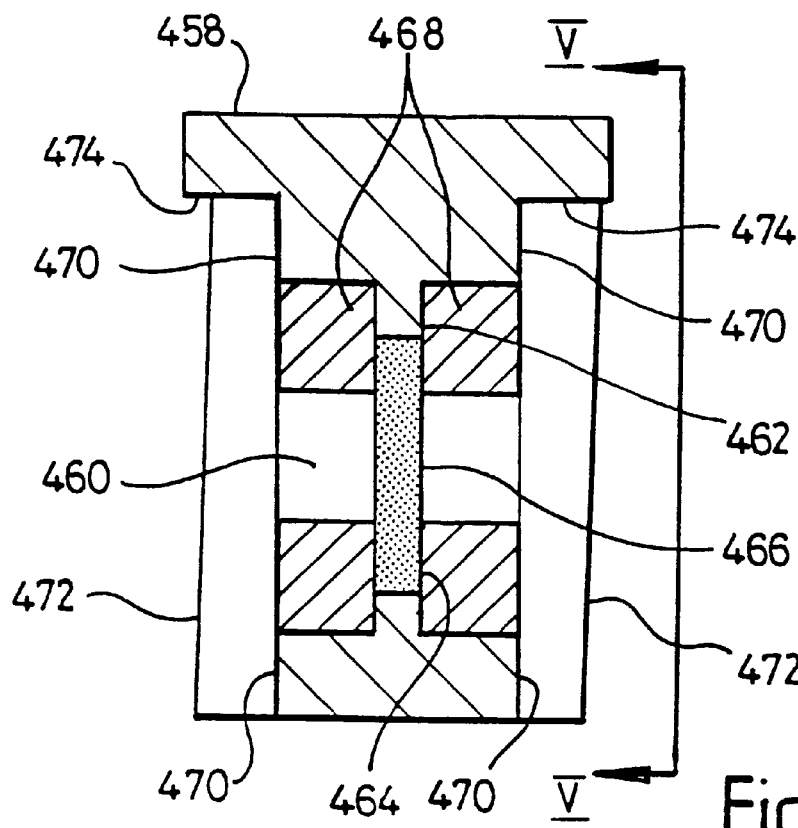
FIG. 5 is schematic sectional view of an optical isolator suitable for use with the optical fibre amplifier assembly of either FIG. 3 or FIG. 4.
Figure 6:
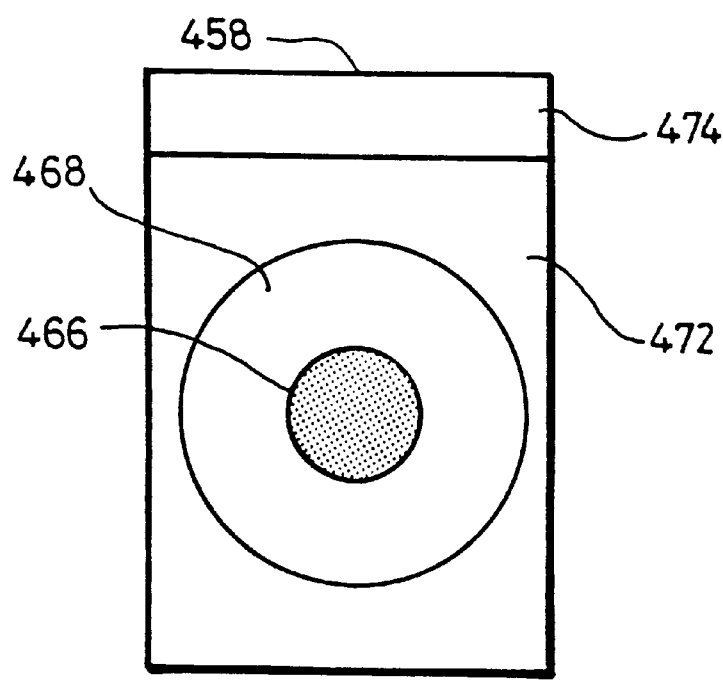
FIG. 6 is a schematic end view of the optical isolator of FIG. 5 viewed in the direction V—V in FIG. 5.

The isolators 322 and 344 are identical and will now be described with reference to FIGS. 5 and 6.

An isolator housing 458 has a circular through-hole 460 including an annular ridge 462 protruding into the through-hole 460 at its mid point. A 400 nm thick plate, here in the form of a disc, of rare-earth iron garnet 466 of the same thickness as the ridge 462 and whose outer radius is the same as the inner radius of the ridge 462 is held in position by a pair of annular ferromagnets 468, one each side of the disc 460, whose outer radii equal the radius of the through-hole 460 and whose inner radii are smaller than the radius of the disc 460.

The ferromagnets 468 have outer surfaces flush with outer portions 470 of the housing 458 so they can be retained by the planar surfaces of birefringent, tapered plates 472 of rutile or calcite, for example. The plates 472 are laterally located on the surfaces to housing 458 by shoulders 474 against which one end of each plate 472 abuts. The plates 472 are glued to the housing 458 to form the completed optical isolator 332 or 342 of FIG. 3.

The disc 466 and ferromagnets 468 are dimensioned and designed to form a 45° Faraday rotator in known manner. The tapered birefringent plates constitute polarisers which provide polarisation independent optical isolation in the manner described in detail in U.S. Pat. No. 4,548,478. Other polarising means may be employed for example polarising sheets such as 200 nm Polacor (trademark) sheet. The various optical surfaces of the optical components are provided with antireflection coatings in known manner.

I claim:

1. A packaged optical amplifier assembly for amplifying an optical signal, the assembly having an input for receiving an optical signal from an input optical fibre, an output for passing an amplified optical signal to an output optical fibre, an optical amplifying fibre having a first end coupled to the input and a second end coupled to the output, and an optical pump coupled to an end of the optical amplifying fibre, wherein the optical signal is collimated and propagates unguided between the input and the first end of the optical amplifying fibre, and is collimated and propagates unguided between the second end of the optical amplifying fibre and the output, the optical pump light from the optical pump being collimated and arranged to propagate unguided between the optical pump and the end of the fibre to which it is coupled, in which the optical pump light and optical signal are combined by a dichroic mirror, and in which there is an optical isolator between either or both of
   (i) the input and the first end of the optical amplifying fibre, and
   (ii) the second end of the optical amplifying fibre and the output.

2. An assembly as claimed in claim 1 in which the optical pump light from the optical pump is directed at an auxiliary mirror and is reflected by the auxiliary mirror to a dichroic mirror where the optical pump light is combined with the optical signal.

3. An assembly as claimed in claim 1 in which the optical pump is coupled to the first end of the optical amplifying fibre.

4. An assembly as claimed in claim 1 in which the optical pump is coupled to the second end of the optical amplifying fibre.

5. An assembly as claimed in claim 1 in which there are two optical pumps, one coupled to each of the first end and second end of the optical amplifying fibre.

6. An assembly as claimed in claim 1 in which each optical pump is located adjacent the end of the optical amplifying fibre to which it is optically coupled.

7. An assembly as claimed in claim 1 in which the optical axes of the input and first end of the optical amplifying fibre, and the optical axes of the output and the second end of the optical amplifying fibre, are coincident.

8. An assembly as claimed in claim 1 in which each optical pump is hermetically sealed within the packaged optical amplifier assembly.

9. An assembly as claimed in claim 8 in which each optical pump is located within an hermetically sealed sub-package.

10. An assembly as claimed in claim 9 wherein an optical window is formed in the sub-package by a collimating lens which collimates the light from the optical pump.

11. An assembly as claimed in claim 9 wherein an optical window is formed in the sub-package by the dichroic mirror.

12. An assembly as claimed in claim 1 in which each optical pump and each optical isolator is mounted on a common thermoelectric cooling means.

\* \* \* \* \*